Dec. 11, 1923.  
G. DE GIGLIO  
1,477,116  
CALCULATING MACHINE  
Filed Feb. 26, 1921  
6 Sheets-Sheet 1

Inventor  
Gaetano de Giglio  
By Henry Orth Jr  
Atty

Dec. 11, 1923.　　　　　　　　　　　　　　　　　　1,477,116
G. DE GIGLIO
CALCULATING MACHINE
Filed Feb. 26, 1921　　　　6 Sheets-Sheet 2

Inventor
Gaetano de Giglio
By Henry Orth
Atty.

Dec. 11, 1923.

G. DE GIGLIO

CALCULATING MACHINE

Filed Feb. 26, 1921

Inventor.
Gaetano de Giglio,
By Henry Orth
Atty

Dec. 11, 1923.  
G. DE GIGLIO  
CALCULATING MACHINE  
Filed Feb. 26, 1921

Inventor
Gaetano de Giglio,
By Henry Orth
atty.

Dec. 11, 1923.

G. DE GIGLIO 1,477,116

CALCULATING MACHINE

Filed Feb. 26, 1921

Inventor
Gaetano de Giglio,
By Henry Orth Jr.
Atty.

Dec. 11, 1923.

G. DE GIGLIO

CALCULATING MACHINE

Filed Feb. 26, 1921

Inventor
Gaetano de Giglio
By Henry Ortiz Jr.
Atty.

Patented Dec. 11, 1923.

1,477,116

UNITED STATES PATENT OFFICE.

GAETANO DE GIGLIO, OF TURIN, ITALY.

CALCULATING MACHINE.

Application filed February 26, 1921. Serial No. 447,906.

*To all whom it may concern:*

Be it known that I, GAETANO DE GIGLIO, a subject of the King of Italy, residing at Turin, Italy, have invented certain new and useful Improvements in Calculating Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a calculating machine of the kind comprising a number of levers each adapted to be angularly displaced so as to occupy any one of a series of positions numbered from zero to nine, each series corresponding to a different decimal value, so that any desired number can be recorded on the machine by setting one or more of the levers to positions corresponding to the figures constituting the number, the machine being provided with a totalizing device for effecting and indicating the result of arithmetical operations involving two or more such numbers.

The present invention relates to an improved construction of calculating machine of the above type comprising the following characteristic features:

(*a*) The control of each counter wheel or drum of the totalizing device is operated directly by a toothed number segment integral with the corresponding number lever and intermeshing with a toothed wheel having ten teeth integral with the counter wheel.

(*b*) All the number levers and the toothed number segments relating thereto, are carried by a frame so mounted as to be capable of a tilting or rocking movement with the object of effecting the simultaneous disengagement of all the number segments from the toothed wheels of the totalizing counters so as to permit the return of the number levers to their zero positions.

(*c*) Special arrangements are provided for effecting the "carry over" from each counter wheel to the adjacent counter wheel of the next higher decimal value. This device comprises for each counter wheel of the machine, a reversible carry over lever actuated by a pin with which each counter wheel is provided, this pin when the counter wheel has completed one revolution, serving to bring the carry over lever into one of its two different positions, while a cam mounted on a cam shaft serves to return the lever to its other or original position when the cam shaft is suitably rotated. During its return to the initial position, the lever acts on the toothed wheel of the counter wheel corresponding to the next higher decimal value and effects the rotation of the latter counter wheel through 1/10th of a revolution thus effecting the "carry over". The actuation of the cam shaft controlling the "carry over" levers and the operation of the rocking frame of all the number levers is effected by means of a longitudinal carry over bar or treadle exterior to the machine.

(*d*) A special multiplying device is provided constituted by a number of toothed counter segments, arranged behind the number segments and mounted so as to be capable of rotation about a transverse shaft, each counter segment being resiliently held in engagement with a projection on the corresponding number segment. All the counter segments are carried by a counter segment frame capable of sliding longitudinally so as to be displaced in successive steps each equal to the lateral space between two adjacent counter segments. Locking means, engaging with the teeth of each counter segment are provided for the purpose of locking each counter segment in the position which it assumes when the corresponding number segment is adjusted for recording the number to be multiplied, i. e., the multiplicand. Mechanism actuated by a "multiplying" lever is also provided, to effect the repeated rotation through a constant arc of all the counter segments thus locked, so as to effect the multiplication by repeating the multiplicand a number of times equal to that of each figure of the multiplier after the counter segment frame has been adjusted to a position corresponding to the decimal value of this figure of the multiplier. The multiplying lever during its forward movement, also serves to actuate a counting device for registering the multiplier, while during its return movement it serves to effect the actuation of the carry over bar of the machine thus effecting the carry over between the different counter wheels and moreover the return to zero of the number segments.

(e) This machine furthermore comprises a device for returning to zero all the number segments, counter segments and counting device for registering the multiplier.

The improved machine also comprises other constructional details hereinafter described.

The invention is illustrated in the accompanying drawings which show by way of example one constructional form of the invention.

Referring now to the drawings, the improved calculating machine is shown as comprising a small casing the front semicylindrical walls of which are provided with a number of transverse slots 10 equally spaced apart, the side of each slot being graduated with the figures from zero to nine. Each of these slots represents a different decimal value, that is to say, units, tens, hundreds etc. counting from right to left; or hundreds, tens, units, tenths, hundredths, etc. according to whether a decimal point is interposed or not after the first two figures. A number lever 11 projects from each of the slots 10 for recording the figures of a number by moving this lever along the slot 10 and until the lever is opposite the desired figure on the side of the slot. In the front wall of the casing, underneath each slot 10, there is provided an opening 12 through which the figures from zero to nine marked on each counter wheel of the totalizing device appear. These figures, read from left to right according to their decimal value, indicate the number which is the result of the arithmetical operation. The machine is also provided with a longitudinal carry over bar or treadle 13 located in front of the casing near its base, by lowering which bar there is effected in the first place the return to zero of the number levers 11 and subsequently the operation of the internal mechanism of the machine so that through the opening 12 will appear the number constituting the result of the operations.

Figure 2:
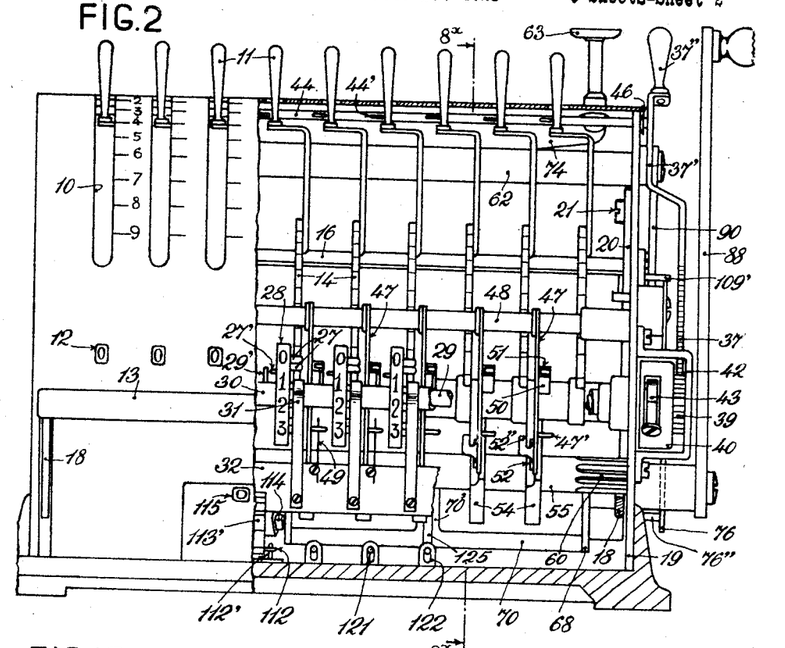
Figure 3:
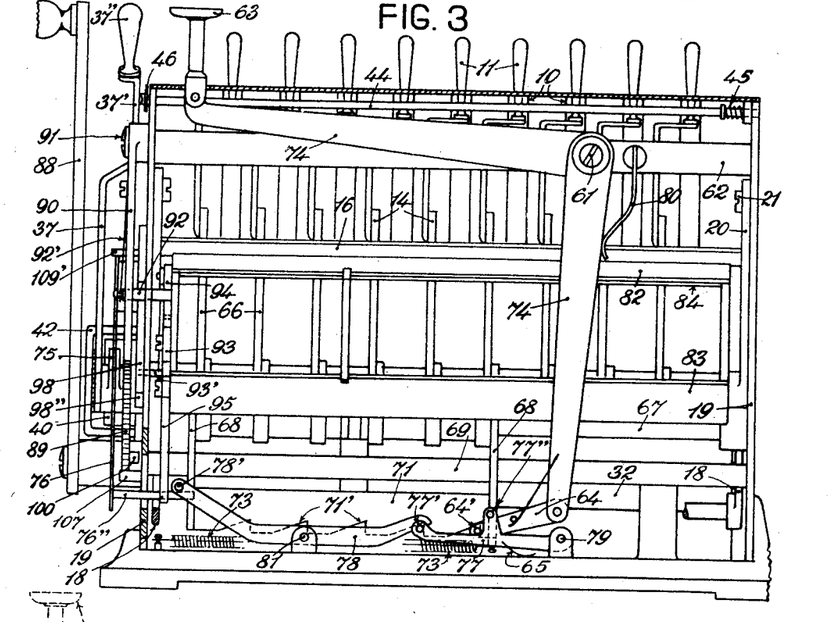
Figure 8:
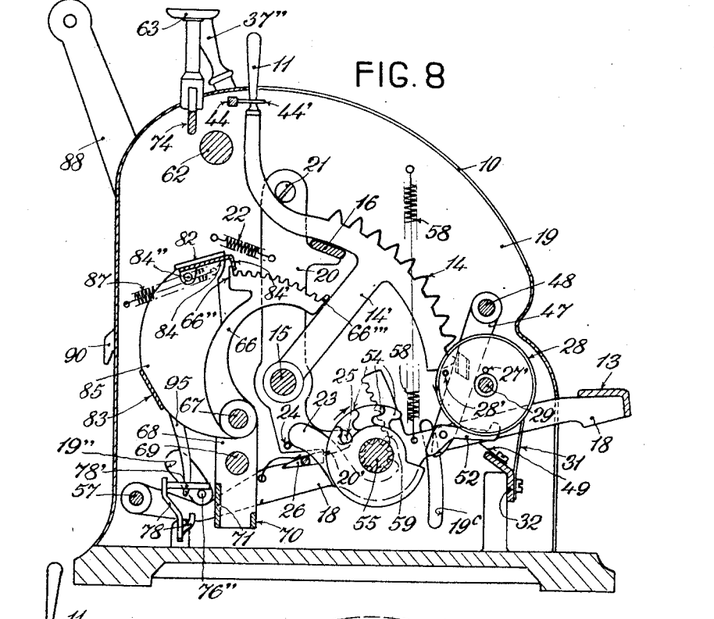
Figure 8 is a view in transverse section on the line 8ˣ—8ˣ of Figure 2.
Figures 9, 16:
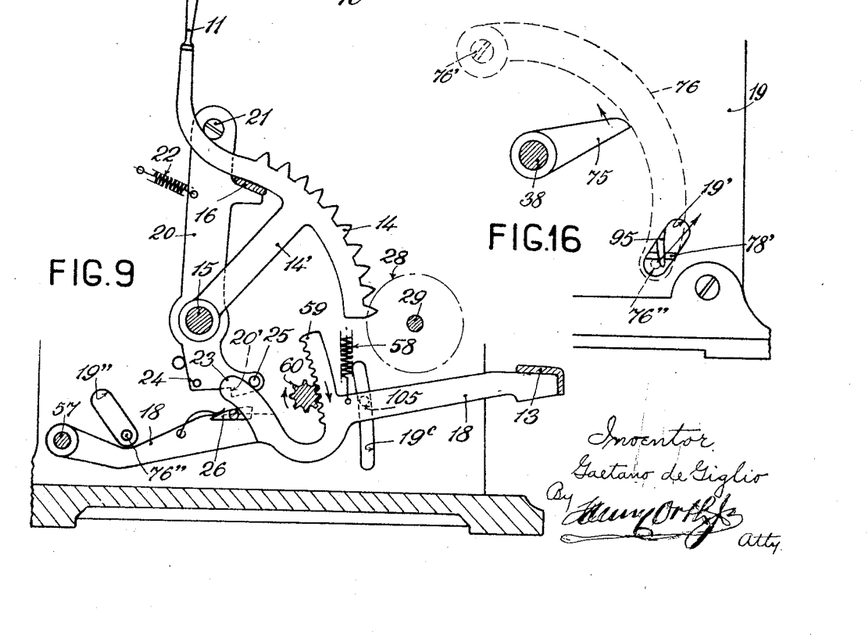
Figure 9 is a similar view of a portion of the machine with the parts in another working position.
Figure 16 is a detail view of a portion of the machine.
Figure 10:
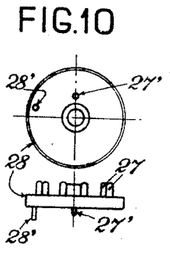
Figure 10 is a view in elevation and plan of one of the counter wheels.
Figure 11:
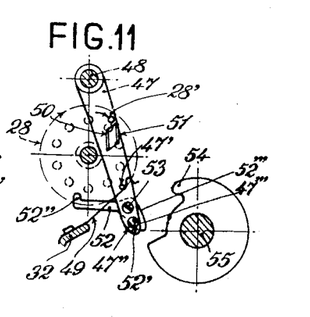
Figures 11 and 12 are detail views showing the carry over lever in two different operating positions.

Each number lever 11 (see Figures 1, 2, 3) is formed integral with a toothed number segment 14, provided with ten teeth, mounted so as to rotate about a transverse shaft 15 carried by a pair of lateral frame supports 20 arranged adjacent to the lateral walls 19 of the casing and pivotally mounted on these walls by means of pivots 21. Each segment 14 is maintained normally raised and in engagement with a stop or cross-bar 16 by means of a spring 17. The rocking frame 16, 20 is drawn back by a spring 22 (see Figures 8 and 9) and is normally locked in the position shown in Figures 1 and 8 by a tongue 23, which projects from one of the lateral supporting arms 18 of the treadle 13 and is interposed between pins 24, 25, mounted on one of the lateral supports 20. A further locking is effected by the engagement of a spring catch 26 pivotally mounted on the arm 18 with a notch or recess 20′ provided in the lateral support 20.

Figures 1, 17, 18, 19:
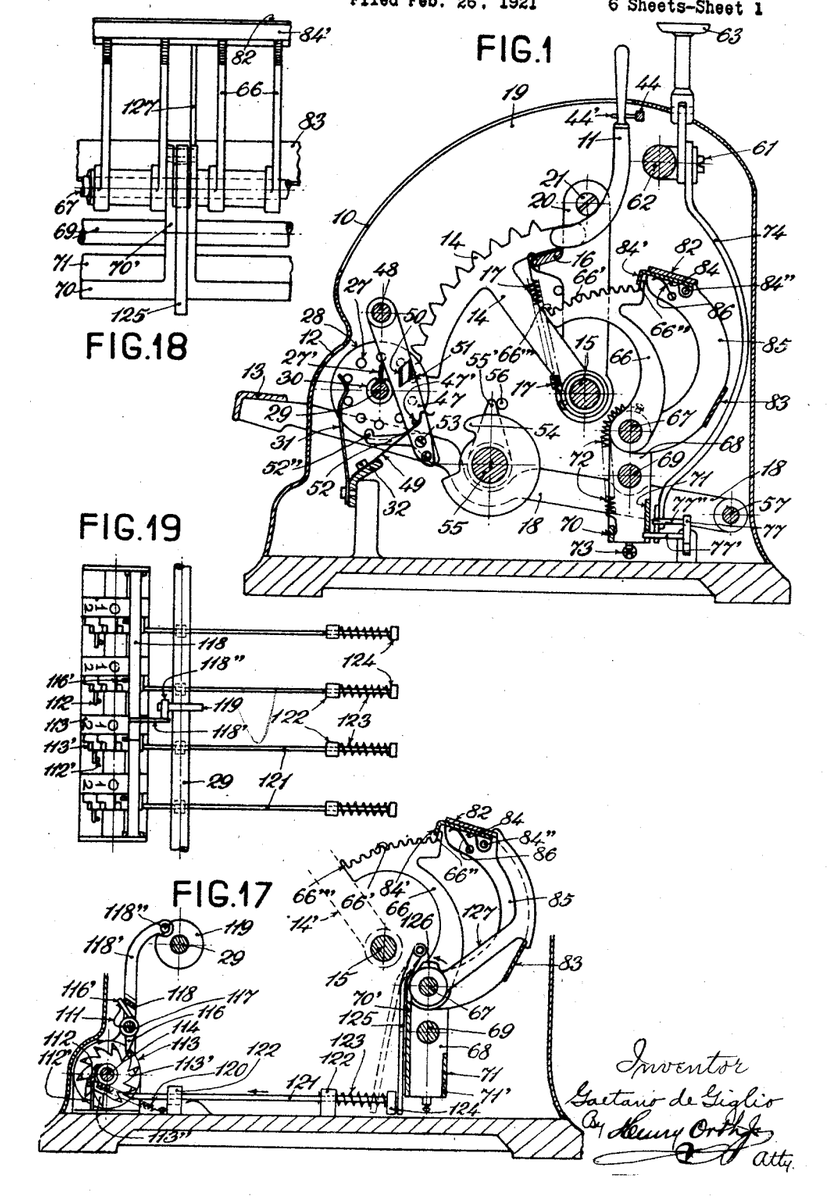
Figures 1, 2 and 3 illustrate the machine as a whole in transverse section and front and rear elevation partly in section respectively.
Figure 17 illustrates in transverse section, the counting device for registering the multiplier.
Figure 18 shows in end elevation the mechanism for operating the counting device.
Figure 19 is a plan view of the counting device.
Figure 13:
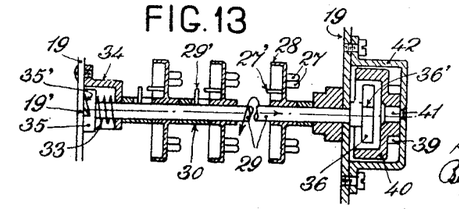
Figure 13 shows in detail the device for returning the counter wheels to zero.

In front of the series of number segments 14 is arranged the totalizing device constituted by at least as many elements as there are segments 14. Each element comprises a counter wheel or drum 28 provided on one face with ten projecting pins 27 with which the corresponding segment 14 intermeshes. The different counter wheels 28 are spaced apart by sleeves 30 and can rotate freely on the transverse shaft 29. On the edge of each counter wheel are engraved the numbers from zero to nine, uniformly spaced so as to be visible through the corresponding opening 12 in the front wall of the casing. A flat spring 31, secured to a transverse bar 32 engages with the points 27 as shown in Figure 1 and thus serves as a position defining catch for the counter wheel 28 at each tenth of a revolution. The transverse shaft 29 is so mounted as to be capable of being displaced axially relative to the walls 19 of the casing (see Figure 13) in opposition to a spring 33, contained in a box 34, the spring 33 pressing against a collar 35 mounted on the shaft 29 so as to effect the engagement of a notch 35' in the collar 35 with an oblique tooth 19' provided in the left hand wall of the casing of the machine. This shaft 29 is provided with as many radial pins 29' (see Figures 1, 2 and 13) as there are counter wheels 28 of the totalizing device. Each counter wheel is provided with an axially projecting pin 27'. The shaft 29 is arranged to be rotated in the manner hereafter described, by means of a toothed zero return segment 37 (Figure 5) arranged outside the wall 19 on the right of the machine and pivotally mounted at 38. The segment 37 is arranged to be maintained in its normal position (shown in Figures 5 and 6) by a spring 38'. The return segment 37 intermeshes with a pinion 39 integral with a drum 40 rotatably mounted on a pivot 41 carried by a bridge-piece 42 secured to the wall 19 on the right. The drum 40 is provided with a spring actuated pawl 43 (see Figures 2 and 5) engaging with a notch 36' in the edge of a disc 36 integral with the end of the shaft 29. It will thus be apparent that by rotating the segment 37 in the direction of the arrow in Figure 5, the pawl 43 will slide freely on the edge of the disc 36, whereas when the segment 37 returns to its initial position, the pawl 43 will engage positively with the notch 36' and the shaft 29 will be rotated. The oblique tooth 19' reacting on the collar 35, moves the shaft 29 axially toward the right, Figure 13, so that the radial pins 29' each come within reach of the corresponding axial pivots 27' of each counter wheel 28. The result is that all the counter wheels of the totalizing device which are not in the zero position are forced to turn in the direction indicated by the arrow in Figure 13 until the tooth 19' again enters the interior of the notch 35' of the collar 35. The shaft 29 then moves towards the left and the pins 29' leave all the pins 27' and therefore the counter wheels in the zero position as will be indicated at the openings 12. By operating the segment 37 therefore as described above, all the counter wheels of the totalizing device are simultaneously returned to zero.

With the object of preventing the number levers 11 from being operated during the operation of returning the totalizing device to zero, and until this has actually been effected, a locking device for these levers is provided. This device consists (see Figures 3 and 5 to 7) of a longitudinal rod 44, arranged close to the ends of the levers 11 and tending to move towards the right (Figure 3) under the action of a spring 45. The other end of the rod 44 projects beyond the case adjacent to the arm 37' and handle 37'' of the segment 37. The rod 44, which is prevented from rotating by a flat link 46 secured to the outer end of the rod and entering a hole in the wall 19, is provided with a number of hooks 44', one for each lever 11 and arranged adjacent to the ends of the levers 11. When the segment 37 is moved to its normal position (Figure 5) the arm 37' engages with the end of the rod 44 and causes the rod to slide inwards so that the hooks 44' do not in any way prevent the operation of the levers 11. On the other hand, when the segment 37 is moved downward to effect zeroizing, the arm 37' leaves the rod 44 and the latter under the action of the spring 45, is moved outwards so that the hooks 44' engage with the levers 11 as shown in dotted lines in Figure 7 and prevent the actuation of the levers 11 until the operation of returning to zero has been effectively completed and the segment 37 has been returned to its initial position.

The device for effecting the carry over between adjacent counter wheels of the totalizing device, is constituted as follows (see Figures 1, 2 and 10 to 12). The device comprises a carry over lever 47 arranged on the left of each counter wheel with the exception of the last wheel to the left, beyond which there are no more wheels on which to effect carrying over. Each lever 47 is pivotally mounted on a transverse shaft 48 and is capable of taking up two different positions, shown in Figures 11 and 12, which are defined by the engagement of a pin 47' mounted on the lever with one or other of two loops or bends formed in the end of a spring 49 secured to the transverse bar 32. At the middle of the front face of each lever 47, two guide ribs 50, 51 are provided, the space between these ribs permitting the passage of a pin 28' with which each counter wheel 28 is provided. The pin 28', when the corresponding counter wheel has accomplished 9/10ths of a revolution, comes into the position shown in Figure 11, while as the counter wheel completes the remaining tenth of a revolution, the pin 28' in passing between the ribs 50, 51, moves the carry over lever 47 to the position shown in Figure 12. The lever 47 is provided with a second lever 52 pivotally secured at 53 to the lever 47, the end 52'' of the lever 52 being adapted to engage with the pins 27 of the immediately adjacent counter wheel. The lever 52 is maintained in the position shown in Figures 1, 11 and 12 by reason of the bearing of a pin 52' against the wall of a hole 47'' in the lever 47, so that in this position the edge 52''' of the lever 52 projects slightly beyond the edge 47''' of the lever 47.

Figure 12:
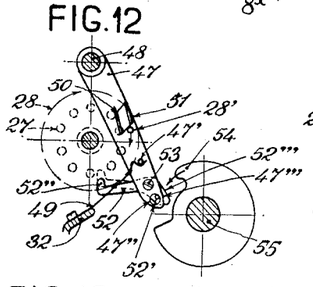

The levers 47, 52 of each carry over device are operated by a cam disc 54 mounted on a cam shaft 55 capable of rotation relative to the walls 19 of the machine. The cams 54 (one for each carry over lever 47)

each have a different angular position on the shaft 55, so that the several cams 54 come into operation successively. The action of the cams 54 on the different levers 47 is accomplished successively, starting with the first lever situated at the right and not simultaneously on all the levers. The cams 54 are rotated in the direction of the arrows in Figure 8 when the treadle 13 is depressed by means of the curved rack 59 which is integral with one of the arms 18 of the treadle, this arm being pivotally mounted as indicated at 57. The rack 59 intermeshes with a pinion 60 formed on the shaft 55. During the rotation of the cams 54, the levers 47, 52 of the carry over device which is in the position shown in Figure 12, are engaged by the corresponding cam 54 acting on the edge 52''' and the lever 52 is thus rocked so that its end 52'' engages with the pin 27 of the next counter wheel 28. Also by engagement with the edge 47''', the cam returns the lever 47 to the position shown in Figure 11 and in so doing rotates the next adjacent counter wheel 28 through an arc corresponding to one figure, thus effecting the carry over. During the return of the treadle 13 to its initial position under the action of the return spring 58 (see Figure 8) the cam shaft 55 rotates in the reverse direction. The limitation of the rotation in one direction and the other of the shaft 55 is effected by a lug 55' on the shaft 55, this lug engaging with one side or the other of a stop 56 secured to one of the walls 19 (see Figure 1).

At the commencement of the depression of the treadle 13, the return to zero of all the levers 11 and of the number segments previously displaced is effected, the tongue 23 (see Figure 9) is disengaged from the pins 24 and 25, and the whole of the frame 20 tilts backwards under the action of the spring 22, whilst the segments 14, which had been previously displaced, are disengaged from the pins 27 of the counter wheels and, under the action of the springs 17 (see Figure 1) return to their initial position, that is to say to zero. When the treadle 13 returns to its initial position, the tongue 23 again engages with the pins 24, 25 and the catch 26 with the notch 20' so that the frame 20 supporting the segments 14 is returned to its initial position.

Figure 4:
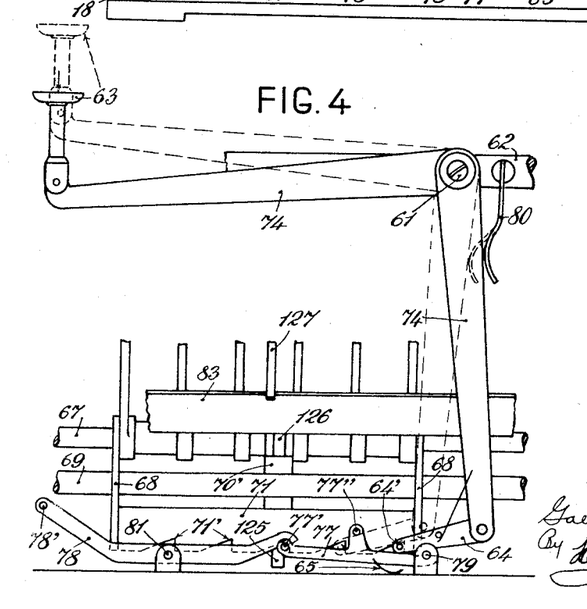
Figure 4 shows in detail the construction and arrangement of the counter segment frame.

The multiplying mechanism (see Figures 1 to 13 and 14, 15) comprises a plurality of counter segments 66, (six in the form shown in the drawing), which are pivotally mounted on a shaft 67 enclosed in a kind of sliding frame constituted by the two end bars 68 adapted to slide along a horizontal shaft 69, the bars 68 being connected together by means of cross pieces 70, 71. The counter segments 66 are spaced apart by the same amount as that which separates the number segments 14 and the forward end of each counter segment is held in contact with a spoke 14' of the segment 14 by means of a spring 72 (see Figure 1). The sliding frame is maintained at one end of its range of travel by means of a spring 73 (see Figure 3) so that the six counter segments 66 correspond to the six first number segments 14 starting from the right. The sliding frame may be moved step by step towards the other wall 19 of the casing, moving at each step an amount corresponding to the distance which separates two counter segments by means of the following device. This device is composed (see Figures 1, 3 and 4) of a bell crank lever 74 pivoted at 61, the lower arm of the lever 74 being pivotally connected to one end of a spring controlled link 64 the other end of which carries a pin 64' adapted to enter one of a number of teeth 71' formed in the cross piece 71 of the sliding frame. The next adjacent tooth 71' in the frame engages under the action of a spring 65 with a pin 77' on a lever 77 pivoted at 79, the lever 77 being provided with another pin 77'' engaged by the upper edge of the link 64. By pushing the button 63 downwards, as shown in Figure 4, in opposition to the action of the spring 80, the link 64 draws the sliding frame through a distance corresponding to the interval between two teeth 71' and equal to the spacing of the counter segments, so that the pin 77' of the lever 77 in entering the next tooth, locks the sliding frame in the new position. On releasing the button 63, the lever 74 returns to the normal position whilst the link 64 engages with the next tooth 71' so that by again depressing the button 63, the sliding frame is moved a further step, and so on. In the form shown in the drawing, the sliding frame can be moved four such steps.

The return to zero of the sliding frame is effected automatically upon the actuation of the segment 37. The segment 37 is provided with a finger 75 (see Figures 5 and 16) adapted to act upon a curved lever 76 pivotally mounted at 76'. The lever 76 at its lower end, is provided with a pin 76'' projecting into the interior of the casing of the machine through an opening 19'' and engaging with the under side of a pin 78' on a lever 78 which is pivoted at 81. The other end of the lever 78 engages with the pin 77' of the lever 77. It will thus be seen that when the segment 37 is moved downwards, the finger 75 raises the lever 76', and the pin 76', acting upwards on the pin 78' of the lever 78, tilts the latter so that its other end depresses the pin 77' of the lever 77 and disengages the stop and movement catches of the sliding frame which is thus free to return to its zero position under the action of the return spring 73.

Each of the counter segments 66 is provided with ten notches 66' between adjacent teeth, whilst the end teeth 66″, 66‴ of the segment is longer than the nine intermediate teeth. In the notches 66′ are engaged the downwardly projecting edge 84′ of a plate 84 pivotally mounted at 84″ upon a pair of side plates 85 which in turn are pivotally mounted on the shaft 67 and connected together by means of cross pieces 82 and 83 so as to form a kind of oscillating structure. The plate 84 is by means of the spring 86 normally maintained in contact with the upper cross piece 82 so that its edge 84′ is out of engagement with the notches intermediate the end teeth of the counter segments, the end tooth 66″ abutting against the edge 84′ when the oscillating structure is by means of the spring 87 (see Figure 8) maintained in its normal position. The structure is capable of being oscillated intermittently in the direction indicated by the arrow in Figure 5, by means of the multiplying lever 88 secured to an extension of a shaft 69 on which is also secured the toothed segment 89. This latter is adapted to engage with the toothed segment 90, pivoted at 91 (see Figures 5, 6), and provided with an angular slot 90′ through which projects a pin 92 secured to the side plate 85 on the right of the oscillating structure, the pin 92 passing through a curved slot 19ª in the wall 19. The segment 90 is resiliently connected to the pin 92 by means of a spring 92′ integral with the segment and engaging with a groove in the head of the pin 92. On the right hand side plate 85 of the oscillating structure a lever 93 is pivotally mounted (see Figures 14, 15) the upper end of the lever 93 engaging with the forked end 94′ of a lever 94 formed integral with the oscillating pivot 84″ on the right of the plate 84. The lower rounded end of the lever 93 is capable of engaging with one or other of two notches 95′, 95″ formed on the short arm of a bell crank lever 95. The latter is pivotally mounted at 96 on the plate 85 on the right of the structure and normally pressed against the end of the lever 93 by a spring 97. The lower end of the lever 93 is provided with a pin 93′ passing freely through a curved slot 19ᵇ in the wall of the casing and engages with an angular notch 98′ in a lever 98 pivotally mounted at 99 and provided with a projection 98″.

Figure 14:
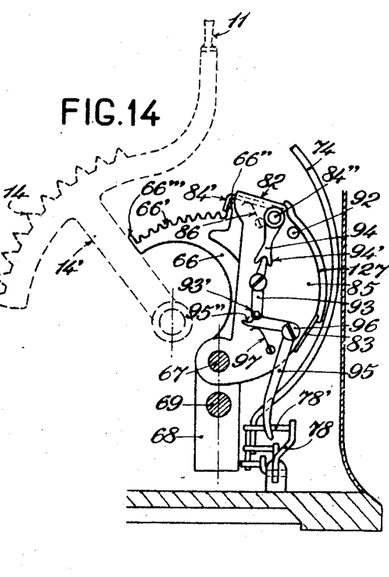
Figures 14 and 15 show in side elevation the multiplying mechanism in two operating positions.

Under normal conditions the bell crank lever 95 is in the position shown in Figure 14 and the lever 93, under the action of the spring 86 which tends to maintain the plate 84 raised, is in engagement with the notch 95′ of the lever 95. When the multiplying lever 88 is actuated (see Figure 6) the segment 89 actuates the segment 90 so that this latter moves the pin 92 and effects the forward oscillation of the oscillating structure. At the end of the oscillation, the teeth of the segment 89 are disengaged from those of the other segment 90 but at the same time a projection 100 on the rear face of the segment 89 engages with the projection 98″ of the lever 98 and effects the forward oscillation of the latter. Owing to the engagement of the pin 93′ with the sides of the angular slot 98′ the lever 93 is carried from the position shown in Figure 14 to the position shown in Figure 15, that is to say with its lower end in engagement with the notch 95″ of the lever 95. The lever 94 is consequently moved so that the edge 84′ of the plate 84 enters the hollow 66′ of the counter segments 66 and locks all these segments.

If all the number segments 14 corresponding to the counter segments 66 are in zero position, the edge 84′ of the plate 84 enters the hollow 66′ adjacent to the tooth 66‴ of all the counter segments; if on the other hand all or part of the number segments 14 had been previously moved with the object of registering a number in the machine, then, since each counter segment 66 under the action of the spring 72 is held up against the spoke 14′ of the corresponding segment 14, the locking of the different counter segments 66 takes place in their respective position acquired by reason of the previous movement of the corresponding number segments 14. Once the locking of the counter segments is effected, the projection 100 of the segment 89 leaves the projection 98″ and the whole of the oscillating structure, under the action of the spring, returns to its initial position.

A finger 101 is connected to the shaft 69 (see Figures 5, 6), while outside on the wall 19 to the right is pivotally mounted at 102 a rocking lever, one arm 103 of which engages under the action of a spring 104 against a pin 105 connected to one of the supporting arms 18 of the treadle 13, the pin 105 passing through a slot 19ᶜ in the wall 19. The other arm 103′ of the rocking lever is located adjacent to the finger 101. By this arrangement when the multiplying lever 88 is depressed to the position shown in Figure 6, the finger 101 is in sliding contact with the arm 103′ of the rocking lever and effects the upward oscillation of this lever as shown in dotted lines in Figure 5. On the other hand, when the lever 88 is returning to its initial position the finger 101 engages positively below the arm 103′ of the rocking lever and causes a downward oscillation of this lever as shown in the other dotted position in Figure 5. During this movement of the rocking lever its arm 103 acting on the pin 105, causes the depression of the treadle 13 and consequently the actuation of the internal mechanism of the machine as already explained.

Upon the return of the multiplying lever 88 to its initial position the projection 100 of the segment 89 engages with the front face of the projection 98″ of the lever 98 and rocks this lever backwards in opposition to the action of the spring 106, whilst the pin 93′ moves freely in the circumferential portion of the angular slot 98′. On the other hand the teeth of the segment 89 intermesh with the teeth of the segment 90 which also rotates backwards in opposition to the spring 92′ the pin 92 moving freely in the the circumferential portion of the angular slot 90′.

It should be noted that the segment 89 terminates in a shoulder or non-toothed portion 89′ which engages with the teeth of the other segment 90 if the operator attempts to depress again the multiplying lever 88 before having returned it to its initial position limited by the stop 107. The said shoulder prevents an action induced by the controlling lever 88.

Figure 15:
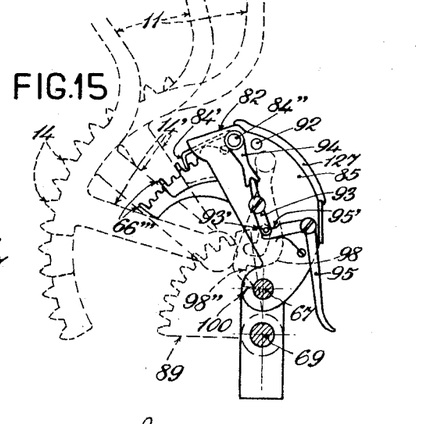

It should also be noted that during the actuation of the segment 37 and of the finger 75 actuating the lever 76, the pin 76″ of this latter acts on the end of the bell crank lever 95 (see Figure 16) and effects its backward movement so that if the end of the lever 93 is in engagement with the notch 95″ as is the case in Figure 15, it is disengaged from the notch and returns to the position shown in Figure 14 so as to effect the unlocking of the counter segments 66 which are thus brought to their zero position.

Figure 5:
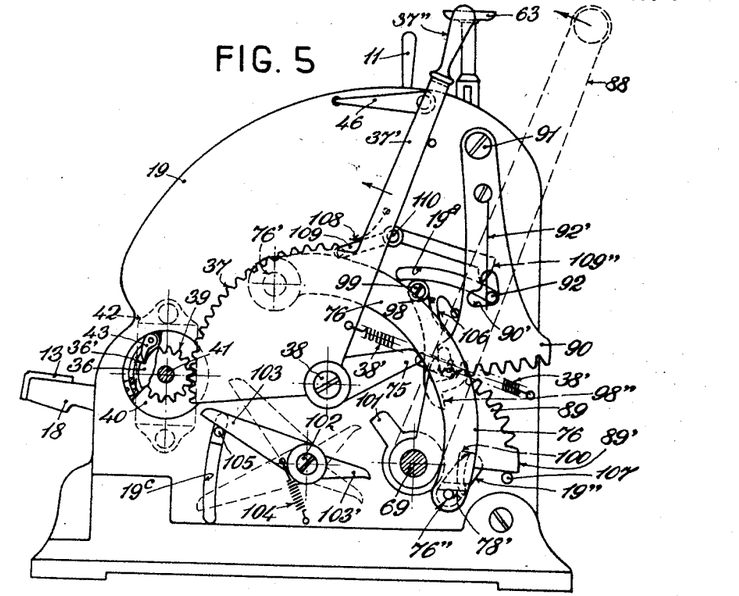
Figures 5 and 6 illustrate the machine in side elevation in two different operating positions.
Figure 6:
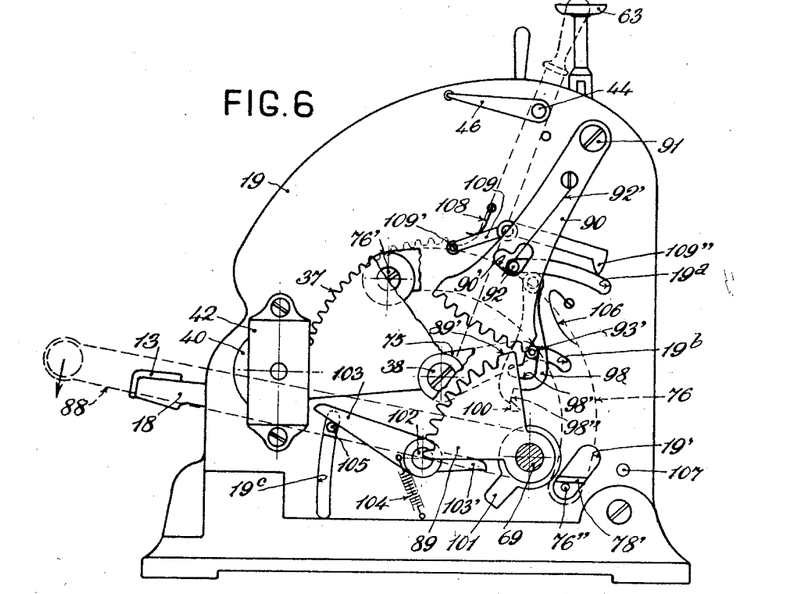
Figure 7:
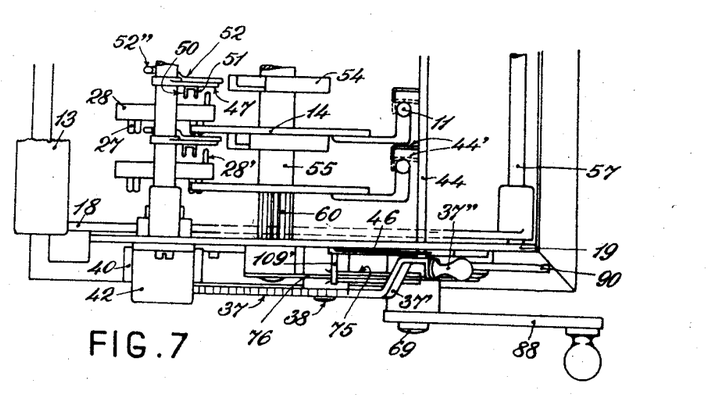
Figure 7 is a plan view of a portion of the machine.

Resting upon the convex edge of the lever 76, under the action of a spring 108, is one end 109′ of a lever 109 pivoted at 110 and terminating at the other end in a tooth 109″ (see Figures 5, 6). Upon returning to zero all the elements of the machine, by actuating the segment 37, and raising the lever 76, the tooth 109″ is lowered and is interposed in the path of the pin 92 thus preventing any undue movement of the oscillating structure until zeroizing has been effectively accomplished. This prevents all risk of injury which would result from the operation of the multiplying lever 88 before the machine was set to zero.

The machine is provided with a counting device for registering the number of oscillations given to the multiplying lever 88 at each position of the sliding frame carrying the segments 66. This counting device (Figures 17, 18, 19) is composed in the example shown in the drawing, of a totalizing mechanism having four counter wheels 113, four being the number of positions that the sliding frame for the counter segments may assume. The counter wheels 113 are rotatably mounted on a shaft 114 and are arranged at the lower part of the front of the machine, the casing being provided with suitable openings 115 (Figure 2) through which appear the figures of the numbering from zero to nine of each counter wheel 113. Each counter wheel 113 is provided with a ratchet wheel 113′ having ten teeth in which engages, under the action of a spring 111, a retaining catch 116 mounted on a pivot 117 on which is also pivotally mounted a cross bar 118 against which abut the ends 116′ of all the catches 116. The cross bar 118 is provided with arms 118′ which carry a pin 118″ normally in engagement with an opening in a disc 119 secured to the shaft 29 of the counter wheels 28. Each counter wheel 113 is provided with a spring 120 secured at one end to the counter wheel and at the other end to a fixed point on the base of the machine. The rotation of each counter wheel 113 is arrested when a pin 112 integral with the counter wheel abuts against a sationary stop 112′. In this position the zeros of the numbering on the counter wheels 113 appear at the openings 115.

On the base of the machine, and corresponding to the ratchet wheel 113′ of each counter wheel 113, is arranged a push rod 121 mounted so as to be capable of sliding axially in suitable guides 122. The front end of the rod 121 operates the ratchet wheel 113′, a portion of each of the teeth of this wheel being considerably blunted or cut away for this purpose. Each rod 121 is maintained normally in its backward position by a spring 123 interposed between the rear guide 122 and the head 124 with which each rod 121 is provided.

At the end of a vertical projection 70′ on the cross piece 70 of the sliding frame for the counter segments 66 is pivotally mounted a rocking lever 125 the lower end of which is adapted to engage with the head 124 of one or other of the rods 121 according to the position of the sliding frame. The lever 125 is actuated by a cam 126 rotatably mounted on the shaft 67 and connected to the oscillating structure by means of an arm 127 which engages with the cross pieces 82, 83 of this structure, being free to slide axially along these cross pieces when the sliding frame is moved axially. By this arrangement, at each oscillation of the oscillating structure, the lever 125 is moved to the position shown in dotted lines in Figure 17 and actuates the corresponding rod 121 which, at each operation, effects the rotation of the corresponding counter wheel 113 through an arc corresponding to one tooth of the wheel 113′. The number of oscillations of the oscillating structure is thus registered. As these oscillations may at most amount to nine, as will be more clearly seen hereafter, each counter wheel 113 need only register nine oscillations and further rotation of the counter wheel is prevented by completely blunting the last tooth 113″ of the ratchet wheel 113′.

Upon returning to zero all the elements of the machine, the shaft 29 of the counter wheels 28 of the totalizing device is rotated; consequently also the disc 119 rotates and oscillates the arm 118' and the cross piece 118, so that all the catches 116 are disengaged from the ratchet wheels 113' and the counter wheels 113 which had been previously moved return to their zero position under the action of the springs 120.

The method of using and operating the machine, first as an adder and then as a multiplier, will now be described.

The machine is assumed to be completely set to zero by the actuation of the segment 37. The registration of the first number to be added is then effected by suitably moving the corresponding number levers 11 so as to set them to the desired digit figure indicated on the side of each slot 10. The number segments 14 will then rotate the pins 27 and the corresponding counter wheels 28 as many tenths of revolutions as are the digits of the number registered by the corresponding lever 11, so that the desired number will appear at the openings 12. It should here be noted that by reason of the reversibility of the direction of rotation of the counter wheels 28, the number can be corrected by moving any of the levers 11 forwards or backwards without in any way altering the result. The desired number having been registered, the treadle 13 is depressed in order to transfer the number to the totalizing device. The depression of the treadle 13 in the first places causes the frame 20 supporting the segments 14 to be tilted backwards (Figure 9) and all the segments 14 are thus disengaged from the counter wheels 27 and return to their zero position; the shaft 55 is then rotated without effecting any operation.

Upon releasing the treadle bar 13 everything returns to the position shown in Figure 1 and the second number to be added can be registered in the manner above described. During this operation the counter wheel mechanism is adjusted for the carry over from one decimal value to the next decimal value. Supposing for example that in registering the first number the first or unit counter wheel has to be set to the figure "9", the pin 28' of this counter wheel which was in the position shown in Figure 8 would be rotated through 9/10ths of a revolution and will have arrived at the position shown in Figure 11. If the next number to be added involves the addition of the unit "1" on this counter wheel, the counter wheel will be carried to the position shown in Figure 12 while the pin 28' in passing between the guides 50, 51 and engaging with the guide 51 will effect the movement of the lever 47 from the position shown in Figure 11 to that shown in Figure 12. The operation of moving the lever 47 in this manner may be termed the preliminary setting for the addition. It should here be noted that, if in making a correction in the number, the counter wheel 28 were rotated in the reverse direction, the pin 28' in returning through the guides 50, 51 and acting on the guide 50 would return the lever 47 to its original position, so that the reversibility of the mechanism is always ensured and there is always a possibility of correcting the figures. Once the above mentioned preliminary setting is accomplished, which can be effected upon several levers 47 when registering the second number to be added, by lowering the treadle 13 and rotating the shaft 55, the cam 54 corresponding to the lever 47 which was set as shown in Figure 12, acts on this lever and returns it to the position shown in Figure 11. During this return movement of the carry over lever 47 the end 52" of the additional lever 52 is forced to engage between the pins 27 of the next adjacent counter wheel of the totalizing device which rotates through an arc equal to 1/10th of a revolution, thus effecting the carry over.

Owing to the angular displacement between the several cams 54, the carry over during addition is accomplished successively on the different counter wheels. This successive and non-simultaneous action is necessary because it may happen that the addition may require a preliminary setting and a carry over from one or more counter wheels, as will be seen for instance if to the number "999" it were necessary to add "1" in which case three carry overs would be required.

The operation of the machine as a multiplier is as follows:—

The machine is assumed to have been set to zero by the actuation of the segment 37. The number corresponding to the mutiplicand is then registered by suitably moving the required number levers 11. During this operation, the counter segments 66 remain stationary since the tooth 66" is engaged with the edge 84' of the plate 84. The multiplying lever 88 is then pulled forwards and downwards causing the oscillating structure 85 to rock about the shaft 67 actuated by the pin 92 in engagement with the segment 90. The counter segments 66 corresponding to the displaced number segments 14 will then be rocked forwards as shown in Figure 15 until they engage with the spokes 14' of the corresponding segments 14, whilst the remaining counter segments remain stationary resting against the spokes 14' of the corresponding segments 14 which have not been displaced. When the depression of the lever 88 is completed so that the oscillating structure reaches the end of its travel, the tooth 100 on the oscillating lever 98 causes the edge 84' of the plate 84 to enter the notches 66' of the various counter segments, and thus lock these segments in the respective positions to which they have been set during the time that the whole of the oscillating structure with all of the counter segments thus locked oscillates backwards. During the return of the lever 88 to its initial position the finger 101 acting on the end 103' of the lever 103, effects the depression of the treadle bar 13 and the disengagement of the displaced number segments 14 and their return to zero. No preliminary setting is effected during this first actuation of the lever 88, but the cam 126 (Figure 17) acts on the tongue 125 which in turn acts on the first or unit rod 121 which effects the rotation through 1/10th of a revolution of the first counter wheel 113 which thus registers the first stroke or oscillation of the multiplying lever 88. Upon again lowering the lever 88 so as to rock forwards the whole of the oscillating structure and the counter segments 66 locked as above mentioned in their relative positions, the segments 14 are returned to the same position in which they had been placed when registering the multiplicand on the machine. Consequently a number equal to the multiplicand will be added to that previously registered on the machine as soon as, by reason of the depression of the treadle bar 13 when returning the lever 88 to its initial position, the addition has been effected. In other words the multiplicand would have been multiplied by two. The first registering counter wheel 113 will have registered the second oscillation of the lever 88, and upon again operating the lever 88 the multiplication by three will be effected, and so on, up to nine. The button 63 is then depressed and the sliding frame carrying the counter segments is consequently advanced from "units" to "tens" so that by actuating the lever 88 once, twice or three times, the multiplicand will be multiplied by ten, twenty, thirty, etc., whilst the second cylinder 113 will register 1, 2, 3 etc. Upon again moving the sliding frame for the counter segments and by depressing the button 63 actuating the lever 88, the multiplicand will be multiplied by one hundred, two hundred etc. whilst the third counter wheel 113 will indicate the number of strokes or oscillations of the lever 88. At the end of the operation the totalizing counter wheels 28 will indicate the product, whilst the counter wheels 113 of the registering device will indicate the multiplier.

In the machine shown in the drawing, the multiplicand may have at most six figures, this being the number of counter segments 66, whilst the multiplier may have at most four figures, this being the decimal displacement that may be effected of the sliding frame for the counter segments, since for the given number of levers 11, the machine could not deal with a higher multiplicand or multiplier. It is however evident that by increasing the number of levers 11 the range of the machine could be increased.

With regard to the operation above described of the machine as a multiplier, it should be noted that by reason of the fact that the depression of the treadle bar 13 is accomplished when returning the lever 88 to its initial position, the preliminary settings and additions are accomplished during the relatively long time required for the return of said lever 88. On the other hand the disengagement of the number segments 14 being effected at the commencement of the depression of the treadle 13, these segments have sufficient time to return to their zero positions whilst any possible rebound of these segments when returning against the cross piece 16 cannot effect any alteration in the relative position of the elements 27, 28 of the totalizing device from which the segments remain disengaged until the return of the treadle bar 13 to its initial position.

It is obvious that the present machine with suitable modifications could be applied to system of numeration of a non-decimal character.

It is also obvious that the present invention is in no way limited to the precise arrangements described and illustrated, but that, without departing from the principles above explained, the invention may comprise any variations required or considered necessary or advantageous in practice.

I claim:

1. In a calculating machine, digit levers, a sector operated with each lever, a totalizing mechanism having toothed wheels arranged for engagement by said sectors, an oscillating frame in which said levers and sectors are mounted and means to oscillate said frame to move said sectors simultaneously into and out of engagement with said toothed wheels of the totalizer.

2. In a calculating machine, a number wheel, a lateral pin thereon, a sector for setting said wheel, a lever pivoted adjacent the wheel, a guide on said lever engaged by said pin to move it to operating position, a spring to hold said lever in either of two positions, a pawl pivoted on said lever arranged to permit engagement with an adjacent number wheel and a cam to move said pawl first into engagement with an adjacent number wheel and then swing said lever to inoperative position and cause said pawl to move the adjacent wheel one digit.

3. In a calculating machine, a number wheel, a pivoted oscillating frame, a manually set sector mounted in said frame and rotating said wheel, a manually operated lever to swing said frame to and from said number wheel for engagement and disengagement of said sector and number wheel, and a multiplying mechanism arranged to slide digit spaces and including counter segments for operating said sectors.

4. In a calculating machine, a totalizing mechanism, a pivoted frame, manually set sectors in said frame, a totalizing treadle, a rotatable shaft, a pinion on the shaft, a cam nose to move said treadle into and out of engagement with said totalizer, and a rack on said treadle to engage said pinion and actuate said cams after said frame and sectors have moved into disengaging position.

5. In a calculating machine, a totalizer, manually set sectors for operating said totalizer, a slidable frame, counter sectors in said frame arranged to move to the same extent as the manually set sectors, means to lock all the counter sectors in the positions determined by the setting of their corresponding manually set sectors, means to step said counter sectors and frame digit spaces, and an operating lever to oscillate said counter sectors to actuate the manual sectors and thereby the totalizer.

6. In a calculating machine, a totalizer, manually set sectors for operating said totalizer, a totalizing treadle, a frame for said sectors, means on said treadle to move said frame to cause its sectors to move into and out of engagement with said totalizer, multiplying mechanism comprising a lever, a sliding frame, counter sectors in said frame, means to lock the counter sectors in said sliding frame in positions determined by the manually set sectors, a toothed operating sector having a non-toothed portion and actuated by said lever, a second pivoted sector arranged to temporarily mesh with said operating sector and move said sliding frame and cause the counter sectors to register on said totalizer, and means actuated from said lever to actuate said treadle.

7. In a calculating machine, a totalizer having carrying over mechanism, angularly displaced cams to operate said mechanism: a pivoted frame, manually set digit sectors in said frame to operate digit wheels of said totalizer, a treadle to cause said frame to swing and move the digit sectors out of engagement with said totalizer and to actuate said cams to operate said carry over mechanism; a multiplying mechanism comprising a sliding and swinging frame, counter sectors therein arranged to be set in accordance with the setting of said digit sectors, means to lock said counter sectors in their set position for repeated simultaneous movement, a multiplying lever, means operated thereby to swing said sliding frame, and counter sectors to simultaneously operate digit sectors and thereby the totalizer, means operated by the multiplying lever to operate said treadle, and manual means to step said sliding frame digit spaces.

8. In a calculating machine, a totalizer, a swinging frame, manually set sectors mounted in said frame to operate said totalizer, a swinging and sliding frame, counter sectors mounted in the latter frame, means to lock the counter sectors in said sliding frame to positions determined by digit sectors, means to slide the latter frame to different digit positions, a set of counter wheels on which the multiplier is read and mechanism to successively operate said wheels from corresponding successive positions of said sliding frame.

In testimony that I claim the foregoing as my invention, I have signed my name.

GAETANO DE GIGLIO.